United States Patent Office 3,419,116
Patented Dec. 31, 1968

3,419,116
DEVICE FOR OPERATING THE CONTROL OF BOTH BRAKE AND ACCELERATOR OF AN AUTOMOBILE BY SINGLE PEDAL
Vittorio Panto, Piazza Spirite Sante 4, Catania 95131, Italy
Filed Nov. 16, 1966, Ser. No. 594,755
Claims priority, application Italy, Dec. 14, 1965, 27,625/65
3 Claims. (Cl. 192—3)

ABSTRACT OF THE DISCLOSURE

A device for operating the brake and the accelerator of an automobile by a single foot-pedal moving in the same direction, the first part of the movement of the pedal from its position of rest corresponding to the accelerating phase and the second part of its movement, after disconnection of the accelerator, corresponding to the braking phase; the disconnection of the accelerator, occurring at the start of the braking phase, being brought about by a main interrupter operated by the movement of a movable floor-board pivotably mounted on an axle and forming a part of the floor of the automobile; the movable floor-board is provided with resilient means keeping it normally upwards but being capable of being pressed downwards; it is placed under the foot of the driver who operates the single pedal in such a way that it can be kept pressed down by the weight of the foot when the driver, pressing on the pedal to accelerate, keeps his heel resting naturally on the movable floor-board; when the driver begins to press the single pedal right to the bottom in order to brake, because of the natural raising of his heel, the movable floor-board rises upward under the action of the resilient means and operates the main interrupter which controls the means for disconnecting the accelerator; the device is further provided with a secondary safety interrupter designed to automatically disconnect the accelerator at the end of the first part of the movement of the pedal even without the raising of the movable floor-board, so that the single pedal operates only the brake in the case of a break-down of the main interrupter; the device is also provided with first linking means connecting the movable floor-board with the main interrupter and with second linking means connecting the main interrupter with the accelerator and controlled by the main interrupter; said first and second linking means being so constructed as to operate the main interrupter and disconnect the accelerator from the start of the upward movement of the movable floor-board, initiated towards the end of the first part of the movement of the single pedal; it is further provided with third linking means between the pedal and the secondary interrupter.

The present invention relates to a device for operating the control of both the brake and the accelerator of an automobile, trucks or other types of motor powered cars, by means of a single pedal mechanism.

The single pedal mechanism object of this invention has the double purpose and effect of ease of operation and increased safety. Ease of operation arises from the fact that, to apply the brakes, the driver does not need to raise his foot from the accelerator pedal, move it to the left to contact the brake pedal, and then press down on the latter. The first two motions of this operation will be abolished for the following reasons: in order to brake, the driver of an automobile equipped with the single pedal will merely have to continue pressing down on the pedal with which, until then, he has been accelerating. Greater safety arises from the fact that the driver's foot will always be in the braking position. In conjunction with the abolition of the two motions mentioned above, this will render the braking action more rapid.

The single pedal mechanism is not susceptible to jamming, because there are two interruptors to disconnect the accelerator control. This means that, in the most common hydraulic braking system, before the brake-pump which drives the liquid in the braking circuit begins to operate, the link-rods which, starting from the pedal, operate the throttle of the carburetor are disconnected at two different points. On the other hand, the brake-control is rigid in the sense that the pedal operates the brake-pump without interrupters of any kind.

The installation of the single pedal mechanism in an automobile does not require any change in the braking system, even when the car is equipped with servo-brakes.

In no case can there be a break-down of the braking system because of the installation of the presently described single pedal mechanism in an automobile. The only trouble that can arise from wear and tear, from collisions, or from break-downs of the system in general, is the breakdown of the accelerator control; and in that case the car can be driven with the hand-accelerator.

Further features and advantages of the invention will be apparent from the ensuing description, with reference to the accompanying drawings to which the invention is in no way limited.

Figure 1:
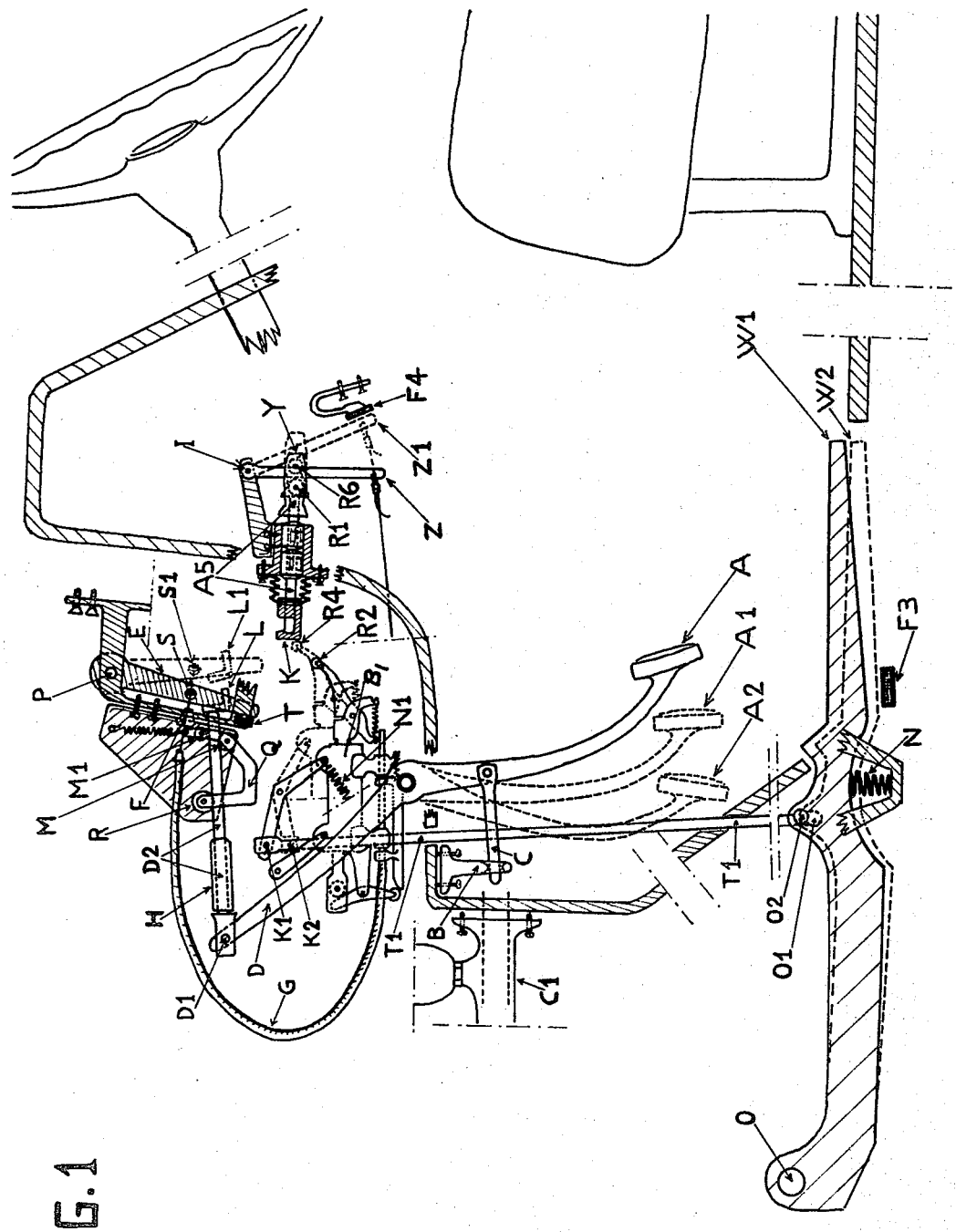
FIG. 1 is an elevational view, partly in cross-section, of a device according to the invention.

In the embodiment shown in the drawings, the single pedal mechanism object of this invention comprises the following elements, which will be described hereafter in the order in which they are listed:

(1) Supplementary support for the push-rod of the brake-pump;
(2) Secondary interruptor;
(3) Main interruptor;
(4) Movable floor-board.

The movable floor-board is an important element of this invention, in that the interruption of the accelerating action at the beginning of the braking operation and other steps of the operation of the mechanism depend on it.

Referring to FIG. 1, the single pedal has two successive portions in its travel: from starting point A to point $A_1$ it operates the accelerator control; from point $A_1$ to point $A_2$ it operates the brake-control. As stated, the movable floor-board disconnects the accelerator at the start of the braking operation, so that from point $A_1$ to point $A_2$, the operation of the pedal is confined to the braking action. The use of the movable floor-board differentiates this invention from all known designs for the use of a single pedal for acceleration and braking.

The various elements will now be described:

SUPPLEMENTARY SUPPORT FOR THE PUSH-ROD OF THE BRAKE-PUMP

This is a hole (FIG. 1), disposed perpendicularly to the push-rod C, and made in a metal element B. Push-rod C operates the pump $C_1$. The hole is of appropriate shape and dimension and location, and its function is to prevent the push-rod, the travel of which has been increased, from going out of line of the point where it comes in contact with the pump, when it is at the maximum distance from it. The element B described above can be replaced by any other element or device which fulfills the function of keeping the push-rod constantly in line with the pump.

The system of link-rods which operates the accelerator begins at the extremity of arm D, which must be made either in one rigid piece with the driver's foot-pedal, or at any rate solid with it. Arm D transmits the push to push-rod $D_2$, which consists of a steel rod connected to arm D by means of a gudgeon pin contained in the fork $D_1$ formed at the end of arm D. Push-rod $D_2$ operates the oscillating arm E which rotates around pivot P. Arm E consists of two parallel and solidly united elements which contain, in the center part, gudgeon pin S and, at the extremity opposite pivot P, a rectangular plate L. This steel plate L receives a push from push-rod $D_2$, so that, when the driver's foot operates the pedal and moves it from position A to position $A_1$, push-rod $D_2$ comes in contact with plate L and moves it to the position $L_1$, which corresponds to the maximum revolutions of the motor, that is to the complete opening of the carburator's throttle. Together with plate L, gudgeon pin S moves to position $S_1$, pulling a steel cable housed inside a sheath G. The stop of sheath G is at point F, in the middle of the frame which supports pivot P. The steel cable transmits the movement of plate L to the main interrupter, which will be described hereinafter. The push-rod $D_2$ is kept constantly pointing upwards by a roller M, which guides push-rod $D_2$ by the constant action of two extension springs hooked to the upper extremity of a double oscillating arm Q. The pivots of arm Q rotate on the same axle that contains, at its center, the roller R. Between the roller M and the extension springs, the arm Q also contains the roller $M_1$, the function of which is to keep, together with roller M, the push-rod $D_2$ in line towards plate L. At a definite distance from its end, the push-rod $D_2$ is furnished with a coaxially mounted hollow cylinder H. Cylinder H comes in contact with roller R when the push-rod $D_2$ pushes plate L to position $L_1$. If the push-rod $D_2$ pushes further, cylinder H deflects it downwards in such a way that it loses contact with plate L. Thus, plate L, pulled by the constant tension of the steel cable in its sheath G, returns instantaneously to position L. That is to say, it brings the accelerator to the minimum revolutions of the motor. This instantaneous return is cushioned by the hard-rubber stop T; otherwise it would be noisy.

The cylinder H functions also to create, in the sensitivity of the pedal, a point of pressure which the driver feels through his feet. The purpose of this point of pressure is to warn the driver that he has reached the end of the accelerator control. Simultaneously with the contact between cylinder H and roller R, the pivotable arm Z (which will be described more fully hereafter), being in the position shown at $Z_1$, will come in contact with a non-rigid, adequately resilient stop $F_4$, the function of which is to reinforce the abovementioned point of pressure. The point of pressure created by the two contacts just described disappears when the braking operation is started, because, the accelerator control being disconnected, the sheathed cable will not be under tension.

Everything described in the last two paragraphs in connection with the accelerator link-rods constitute the secondary interruptor, whose function is to cut the accelerator control before the brake push-rod C comes in contact with the pump $C_1$. It may be noted that the single pedal system would work even without this interrupter, but with the inconvenience that, if the main interruptor (to be later described) broke down, a push of the pedal beyond point $A_1$ would operate simultaneously both the brake and the accelerator. Finally, it may be stated that this secondary interrupter could easily be situated in another position; for instance, the gudgeon pin $D_1$ which moves the push-rod $D_2$ could be fixed in a zone of the pedal near the brake push-rod C.

Figure 2:
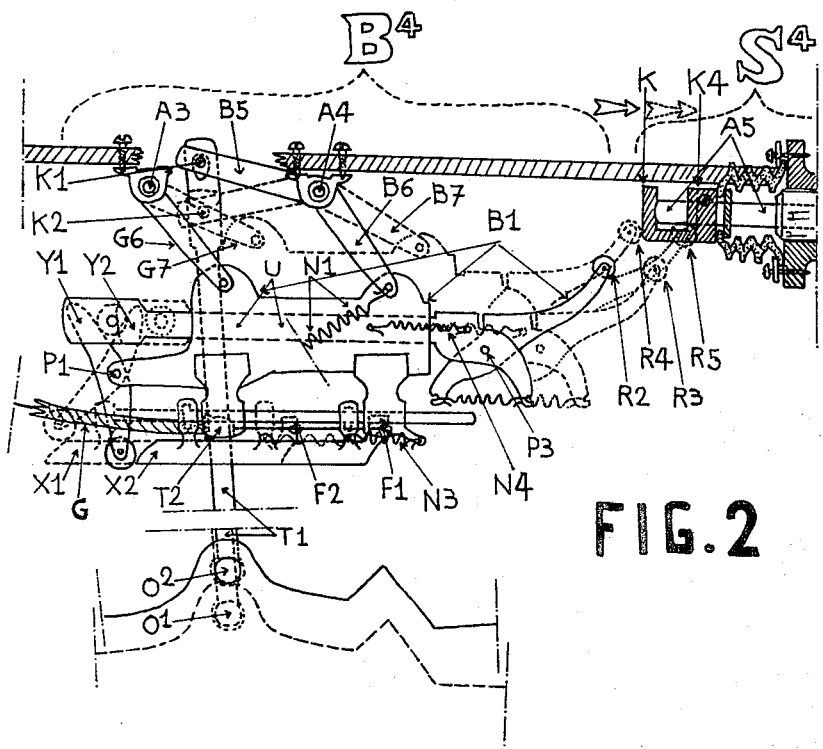
FIG. 2 is an elevational view, with parts in cross-section, on an enlarged scale, of the main interruptor forming a part of the device according to the invention.

The main interruptor is illustrated in detail in FIG. 2. The accelerator link-rods, receiving the movement of the sheathed steel-cable, transmit that movement to the main interrupter.

This main interrupter consists of two moving elements which, when they come in contact with each other, bring about the connection of the link-rods, and when they break contact with each other, bring about the disconnection of the link-rods.

In FIG. 2, one of these two elements is illustrated at the left of the drawing, under the reference $B_4$ and can be called a four armed oscillating assembly. The second of these elements, shown at the right of the drawing under the reference $S_4$ is an axially-sliding assembly. That assembly is only partially shown in FIG. 2, since it is shown in its entirety in FIG. 1.

The assembly $B_4$ comprises an element $B_1$, consisting mainly of a rigid, elongated, three-sided, through-like receptacle.

As stated, the stop point of the sheath G, which contains the steel cable, at the end of said sheath next to the secondary interrupter is at F. The stop point of the other end of the sheath, for the main interrupter is at $T_2$. This stop is a metal element with a hole, rigidly fixed at the lower part of element $B_1$, between two arms 5 and 6, which are made of one rigid piece with $B_1$ or solidly fixed thereto and relatively to each other. The cable contained in sheath G has its end beyond element $T_2$, at another metal element $F_1$ which has a hole. Element $F_1$ is rigidly fixed to a movable rail X which, by means of four arms 1, 2, 3 and 4, is solid with two parallel axles $V_1$ and $V_2$. These two axles run through four copper bushes or through four ball-bearings for axial sliding, contained between the two arms 5 and 6, and between two other arms 7 and 8, solid with element $B_1$.

The sheathed cable, receiving the movement of the oscillating arm E (FIG. 1), moves the end of the cable at $F_1$ together with element $F_1$ and rail X to the position $F_2$, the rail moving to position $X_1$, and therefore pushing an equalizer $Y_1$, mounted on a pivot $P_1$ connected to element $B_1$, to position $Y_2$. When the equalizer has reached position $Y_2$, rail X will continue to move, but the equalizer will remain at position $Y_2$, its lower end, provided with a roller always in contact with the rail, now riding the rail. The feature that no resistance is offered to the continued movement of the rail over a short distance is beneficial in that straining of the cable with a rigid point of arrival is avoided. Otherwise, its life would be short. From position $X_1$, the rail is drawn back to position X by tension spring $N_3$. The equalizer $Y_1$–$Y_2$ presses on element U, a rod of rectangular cross-section which runs inside the central part of $B_1$. Its end near the equalizer terminates into a fork inside of which a roller is located, the equalizer pressing against the roller. At its other end, element U supports a roller $R_2$, by means of an element rotatable around pin $P_3$, and so shaped that roller $R_2$ can swing downwards, but not upwards. This articulation is necessary when roller $R_2$ is in position $R_5$ and the terminal element K of axis $A_5$ of the axially sliding assembly $S_4$ is in the position of rest when it protrudes to the maximum from assembly $S_4$; in this case, the terminal roller of element U will be drawn away from position $R_5$ under element K and will be put back in position $R_4$ by the extension spring shown under pin $P_3$ (FIG. 2).

When element U is pushed by equalizer $Y_1$, it will move towards assembly $S_4$, carrying the terminal roller of element U shown at $R_2$ to the position $R_3$. When the pushing action of the equalizer ceases, element U will be brought back by the action of spring $N_4$ and, as a result, the roller will move back from position $R_3$ to position $R_2$.

All the movements described hitherto occur when the four armed oscillating assembly $B_4$ and the axially sliding assembly $S_4$ are not in contact with each other. Contact between these two assemblies is controlled by the pin $K_1$, which is at the uppermost end of the drag-line $T_1$. The latter is connected to the movable floor-board W by means of pin $O_2$. When pin $K_1$ receives an impulse from the movable floor-board, it moves to position $K_2$, bringing about the upward and forward oscillation of the assembly $B_4$.

Figure 3:
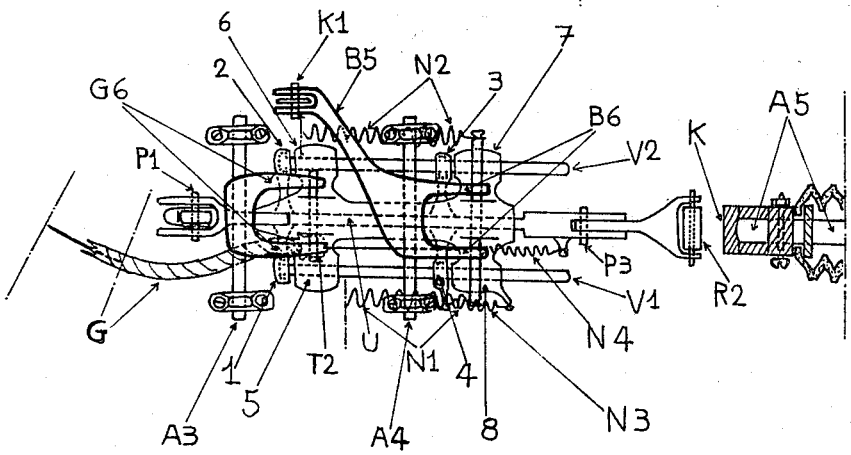
FIG. 3 is a plan view corresponding to FIG. 2.

As shown in FIG. 3, the drag-line $T_1$ and the pin $K_1$ are located in a plane outside the volume occupied by the other parts of assembly $B_4$.

The oscillating assembly $B_4$ is suspended to a frame or supporting plate by two axles $A_3$ and $A_4$, transverse to elements $B_1$ and U and rotating at their ends in four ball-bearings clamped to the frame or supporting plate to which is also affixed the axially sliding assembly $S_4$. The latter must be so mounted that the rod $A_5$ is parallel with element U, as shown in FIG. 3.

The side walls of element $B_1$ are provided near their ends and near their upper edges with two parallel rods. One of these rods engages holes provided in the two arms $G_6$ of a stirrup-like member, the upper part of which is pivotably mounted on axle $A_3$. The other one of these rods engages holes provided in the two arms $B_6$ of a stirrup-like member, the upper part of which is pivotably mounted on axle $A_4$. The distances between said rods and said axles are equal. Member $B_6$ is formed in one piece with an extension $B_5$ of its upper part directed at an angle from the axis of member $B_1$ and the free end of which is engaged by pin $K_1$.

The pair of arms $G_6$ are thns mounted parallel to the pair of arms $B_6$ and remain parallel during their displacements around axles $A_3$ and $A_4$.

When the driver presses down on the movable floor-board, moving it from position $W_1$ to position $W_2$, the drag-line $T_1$ moves the pivot $K_1$ to position $K_2$; as a result, arm $B_5$, rotating on axle $A_4$, brings the pair of arms $B_6$ to the position $B_7$ and, consequently, the pair of arms $G_6$, rotating on axle $A_3$, is brought to the position $G_7$. As the pairs of arms $B_6$ and $G_6$ move to positions $B_7$ and $G_7$, they raise element $B_1$, rod U and all their connected parts, and the terminal roller $R_2$ moves to position $R_4$. In this position, the two assemblies $B_4$ and $S_4$ come in contact and the accelerator link-rods are connected. So that, when the terminal roller $R_4$ is pushed to position $R_5$, the terminal element K of assembly $S_4$ will also be moved to position $K_4$.

The axially-sliding assembly $S_4$ comprises the element K at one end of a steel shaft $A_5$, the other end of which is provided with a fork Y; both fork Y and element K are rigid with shaft $A_5$. Element K is of rectangular section and is designed to receive the push of roller $R_4$, as stated heretofore. Shaft $A_5$ is slidably mounted in two ball-bearings shown in FIG. 1 between the two ends of the shaft. These ball-bearings must be contained in a box or framework which is fixed rigidly to the frame or plate which supports assembly $B_4$, as already stated, so that shaft $A_5$ is parallel to element U and to an imaginary line running through the centers of axles $A_3$ and $A_4$. Fork Y houses a roller $R_1$ and prevents the rotation of shaft $A_5$ around its axis, because the lower part of the rectangle K must be kept always parallel to the pin around which roller $R_2$ rotates. An upper arm connected to the box containing the ball bearings terminates into a pivot I to which is attached pivotably a downward shaft Z adapted to contact roller $R_1$, and to which the drag-link which moves the carburator's throttle is hooked. The operation of the sliding assembly $S_4$ must be as sensitive and free-running as possible; it may be fitted with a covering hood, as shown in cross-section in FIG. 1, to protect it from dust and foreign bodies, since the rapid disconnection of the accelerator's link-rods at the start of the braking operation depends on it.

This disconnection occurs instantly in any position of the pedal from A to $A_1$, even when the pedal is nearest to position A, that is to say at the minimum revolutions of the engine. In this last case, the rest of the travel of the pedal towards position $A_1$ becomes a free movement before the beginning of the braking movement.

When the terminal element K of assembly $S_4$ is pushed by the terminal roller of element U, which moves from position $R_4$ to position $R_5$, as explained before, said element K moves to position $K_4$, thereby moving the roller $R_1$, to which it is rigidly connected, to position $R_6$ (FIG. 1), simultaneously moving the shaft Z to position $Z_1$ by pivotment about pivot I. The minimum revolutions of the engine correspond to the position Z of said shaft, and the maximum ones to the position $Z_1$.

It may be noted that as the main interruptor (FIG. 2) receives the movements from the secondary interruptor by means of a sheathed cable, it could be fixed to the car in positions other than that shown in FIG. 2, provided that it can be operated easily and as directly as possible by the drag-line $T_1$ which is actuated by the movable floor-board.

The action of the movable floor-board, which moves pivot $K_1$, will now be described.

This floor-board, shown in section in FIG. 1, consists of a pair of oscillating arms, parallel to each other and firmly united by a rigid framework. At their forward end, these arms are adapted to pivot around pivot O, which may consist of a pin fitted in the frame of the car. The pivoting may be improved by fitting the two arms with ball-bearings through which the pin passes. If the ball-bearings are waterproofed and prelubricated for life, the construction will have a long life without jamming. The rear end of the floor-board extends inside the cabin of the automobile on the driver's side. The portion of the floor of the cabin in which the movable floor-board is inserted is so chosen that the heel of the driver's right shoe rests on the movable floor-board. At rest the movable floor-board is in position $W_1$; when it is pressed down, it comes to position $W_2$, where it rests on a hard-rubber stop $F_3$. There is also located under the movable floor-board, intermediate its length, a compression spring N, the function of which is to prevent unwanted oscillations of the board when the automobile is going over uneven ground. At rest, the movable floor-board is kept constantly in the upper position $W_1$ by the tension of the two tension springs $N_1$ and $N_2$, hooked to the main interruptor, and by the compression spring N. When the driver presses the pedal from position A to position $A_1$, his foot will naturally remain resting on the movable floor-board. Consequently it will overcome the resistance of the three springs N, $N_1$ and $N_2$; the drag-line $T_1$, receiving the pull of the pin $O_2$ which moves to position $O_1$, moves and brings down pin $K_1$ to position $K_2$, engaging the main interruptor as previously explained. Thus, in that action, by pushing the movable floor-board from position $W_1$ down to position $W_2$, the driver keeps the main interruptor connected, and operates the accelerator control.

The system of link-rods which operate the accelerator, fully described heretofore, are disconnected by the main interruptor at the beginning of the braking operation. This occurs in the following manner: when the driver of the automobile begins the braking operation, he pushes his foot forward. This push can be made only by raising the heel from the floor; this motion comes about naturally. Consequently, the movable floor-board, relieved from the pressure of the heel, rises from position $W_2$ to position $W_1$. This disconnection occurs very rapidly. As a consequence, the arm to which the drag-link which controls the carburator is linked or hooked (drag-link which is kept constantly under tension at the end towards the carburator, as in all automobiles) will return abruptly from position $Z_1$ to position Z, thus cutting the acceleration.

It is possible to modify the main interruptor by using arrangements other than those described in detail hereinabove, such modifications fulfilling the purpose and function of connecting and disconnecting the accelerator link-rods, provided that the movements are short and smooth so as to guarantee a rapid disconnection.

The drag-link $T_1$ which moves the main interruptor could be replaced by an electro-magnet controlled by the movable floor-board, but this is not considered advisable, because, if there were a reduction in, or a failure of, the electricity supply, the correct functioning and dependability of the whole system could no longer be guaranteed.

Having now described my invention, what I claim and desire to secure by Letters Patent is:

1. Device for operating the brake and the accelerator of an automobile by a single foot pedal, which comprises:

a single foot pedal fixed to the lower end of an arm extending upwardly and supported by an axle and pivotable thereon, the movement of said pedal in one direction comprising two successive stages;

a movable floor-board cut out of the automobile floor, having a portion of its surface under the driver's foot and under said pedal, and movable upward and downward around a pivot;

resilient means under said floor-board, adapted to maintain it normally in its uppermost position;

the first stage of the movement of the pedal, during which the driver's foot presses the floor-board downward against the resistance of said resilient means, being the accelerating phase of the automobile;

the second stage of said movement, during which the driver's foot presses further on the pedal and is lifted from the movable floor-board which rises upward, being the braking phase of the automobile;

first linking means connecting said movable floor-board with a main interruptor;

second linking means connecting said main interruptor to the accelerator, and controlled by the said interruptor;

said first and second linking means being so constructed as to operate the main interruptor and disconnect the accelerator from the start of the upward movement of said floor-board initiated towards the end of said first stage;

said first linking means comprising:

an oscillating assembly suspended to a stationary rigid frame by arms pivotable around parallel axles, said assembly being pivotable around said axles;

one of said pivotable arms being extended beyond its axle by an extension rigid with said arm;

a substantially vertical rigid drag-link, the lower end of which is pivotably connected to the movable floor-board at a point intermediate of the latter's length and the other end of which is movably attached to said extension by an axle;

at one end of said oscillating assembly, an arm protruding therefrom and movable with said assembly;

a roller at the free end of said protruding arm;

a slidable assembly comprising a shaft slidable in a housing affixed to said stationary rigid frame at a distance from said oscillating assembly and in the vicinity of said roller, the axis of said shaft being in the same vertical plane as said roller; said shaft being connected at its end opposite said roller with a second roller; a second arm pivotably mounted on an extension of said housing and extending downward beyond and below said second roller, in the same vertical plane as said second roller; the first position of said second arm nearest said housing corresponding to the minimum revolutions of the motor and the second position of said second arm away from said housing corresponding to the maximum revolutions of the motor;

said oscillating and slidable assemblies forming the main interruptor;

said drag-link, being pulled downward by the pressure of the driver's foot during the first stage of the pedal's motion, causing the oscillation of said oscillating assembly toward said slidable assembly, whereby the roller of the oscillating assembly pushes said shaft through said housing, thereby moving said second arm from its first position to its second position; and the cessation of pressure on the floor-board causing a reversal of said movements.

2. A device as claimed in claim 1, in which said second linking means consists of a second drag-link connecting the lower end of said second arm to the carburator throttle of the motor.

3. A device as claimed in claim 1, comprising further:

third linking means and a secondary interruptor connected to the accelerator;

said third linking means and secondary interruptor comprising:

an upward extension of the arm of the pedal, above the axle supporting said arm and rigid with said arm; a push-rod having one end pivotably connected to the upper end of said extension; twin parallel united arms located in front of the other end of said push-rod and pivotable around an upper fixed axle; a gudgeon pin retained by said twin arms at an intermediate point of their length;

a plate supported by said twin arms near the end thereof away from said fixed axle, and facing said other end of the push-rod;

the motion of the pedal through the first stage moving said push-rod against said plate and moving said twin arms around said upper fixed axle from their position of rest corresponding to the minimum revolutions of the motor to a position corresponding to the maximum revolutions of the motor;

a further push on the pedal into its second stage causing said push-rod to escape below said plate, said twin arms thereby pivoting back to their position of rest;

flexible means adapted to transmit the motion of said twin arms to the main interruptor;

said secondary interruptor controlling the accelerator without the upward motion of the movable floor-board, and when the main interruptor is out of order.

References Cited

UNITED STATES PATENTS

| 2,902,123 | 9/1959 | Brugidou | 192—3 |
| 3,006,445 | 10/1961 | Green et al. | 192—3 |

BENJAMIN W. WYCHE III, *Primary Examiner.*

U.S. Cl. X.R.

74—513